United States Patent
Tsuda et al.

(10) Patent No.: US 7,646,409 B2
(45) Date of Patent: Jan. 12, 2010

(54) IMAGE PICKUP APPARATUS AND SUBJECT ID ADDING METHOD

(75) Inventors: Yu Tsuda, Nakai-machi (JP); Masayuki Kurimoto, Minamiashigara (JP); Koichiro Shinohara, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 603 days.

(21) Appl. No.: 11/074,846

(22) Filed: Mar. 9, 2005

(65) Prior Publication Data
US 2006/0038896 A1 Feb. 23, 2006

(30) Foreign Application Priority Data
Aug. 18, 2004 (JP) ............... 2004-238295

(51) Int. Cl.
*H04N 5/76* (2006.01)
*G03B 17/24* (2006.01)

(52) U.S. Cl. .................... 348/231.3; 396/310

(58) Field of Classification Search ............ 348/211.2, 348/211.6, 231.99, 231.2, 231.3, 231.5, 231.6; 396/310
See application file for complete search history.

(56) References Cited

U.S. PATENT DOCUMENTS

| | | | | |
|---|---|---|---|---|
| 5,170,172 A | * | 12/1992 | Weinstein | 342/458 |
| 6,591,068 B1 | * | 7/2003 | Dietz | 396/429 |
| 6,608,563 B2 | * | 8/2003 | Weston et al. | 340/573.1 |
| 6,809,759 B1 | * | 10/2004 | Chiang | 348/211.2 |
| 6,912,002 B1 | * | 6/2005 | Soga | 348/231.2 |
| 2002/0101519 A1 | * | 8/2002 | Myers | 348/232 |
| 2003/0058353 A1 | * | 3/2003 | Tsue | 348/231.2 |
| 2004/0008263 A1 | * | 1/2004 | Sayers et al. | 348/207.11 |
| 2004/0008906 A1 | * | 1/2004 | Webb | 382/306 |
| 2006/0007315 A1 | * | 1/2006 | Singh | 348/207.99 |
| 2006/0110154 A1 | * | 5/2006 | Hulsen et al. | 396/310 |
| 2007/0003113 A1 | * | 1/2007 | Goldberg | 382/118 |

FOREIGN PATENT DOCUMENTS

JP 2000-216989 8/2000
JP 2000299838 A * 10/2000

* cited by examiner

*Primary Examiner*—Timothy J Henn
(74) *Attorney, Agent, or Firm*—Morgan, Lewis & Bockius LLP

(57) ABSTRACT

An image pickup apparatus includes an image data acquisition part that acquires image data obtained by photographing a subject, a subject ID acquisition part that acquires, on the basis of a signal obtained from the subject, a subject ID to identify the subject, and a memory that stores the image data acquired by the image data acquisition part and the subject ID acquired by the subject ID acquisition part, the image data and the subject ID being related. A subject ID adding method includes acquiring image data obtained by photographing a subject, acquiring, on the basis of a signal obtained from the subject, a subject ID to identify the subject, and connecting the image data and the subject ID to store them.

17 Claims, 14 Drawing Sheets

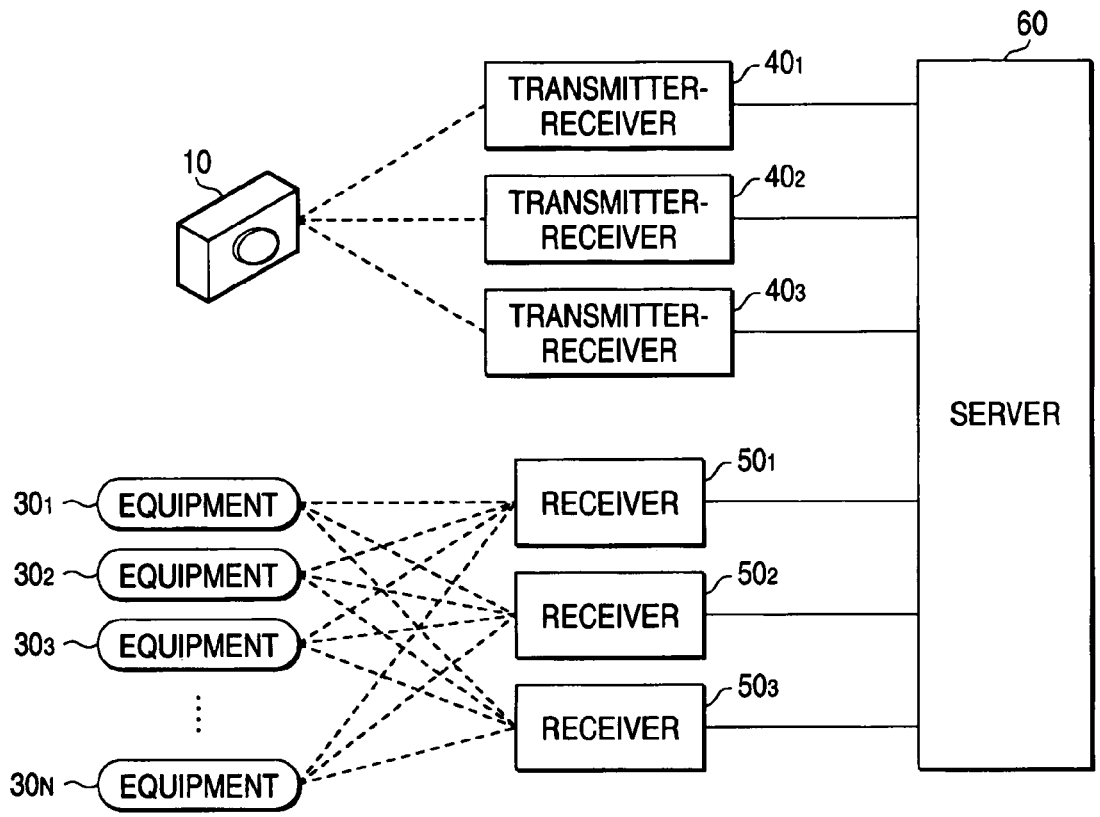
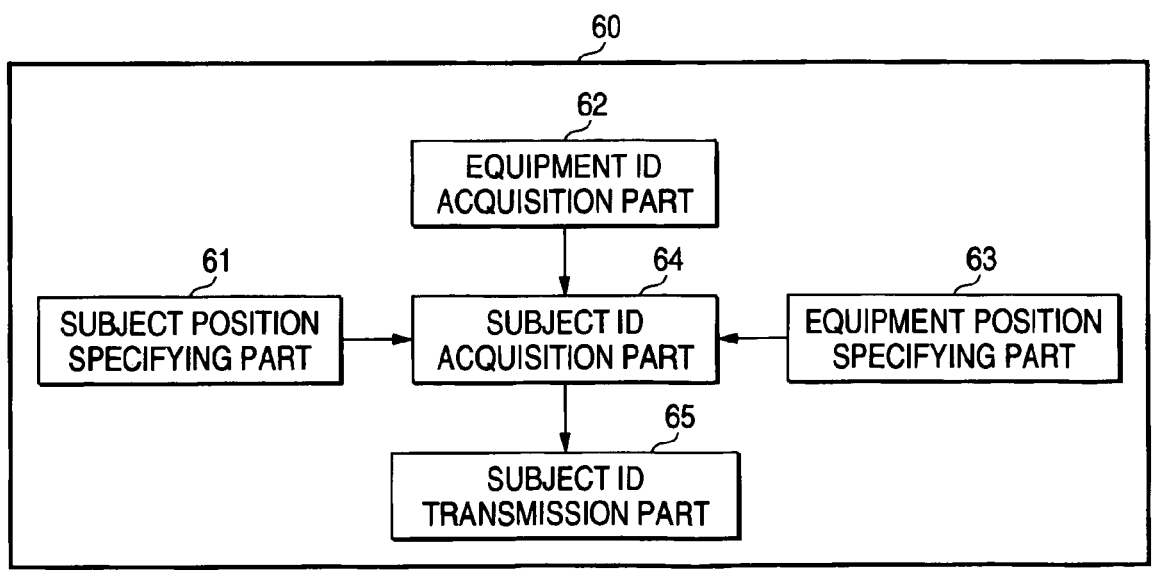

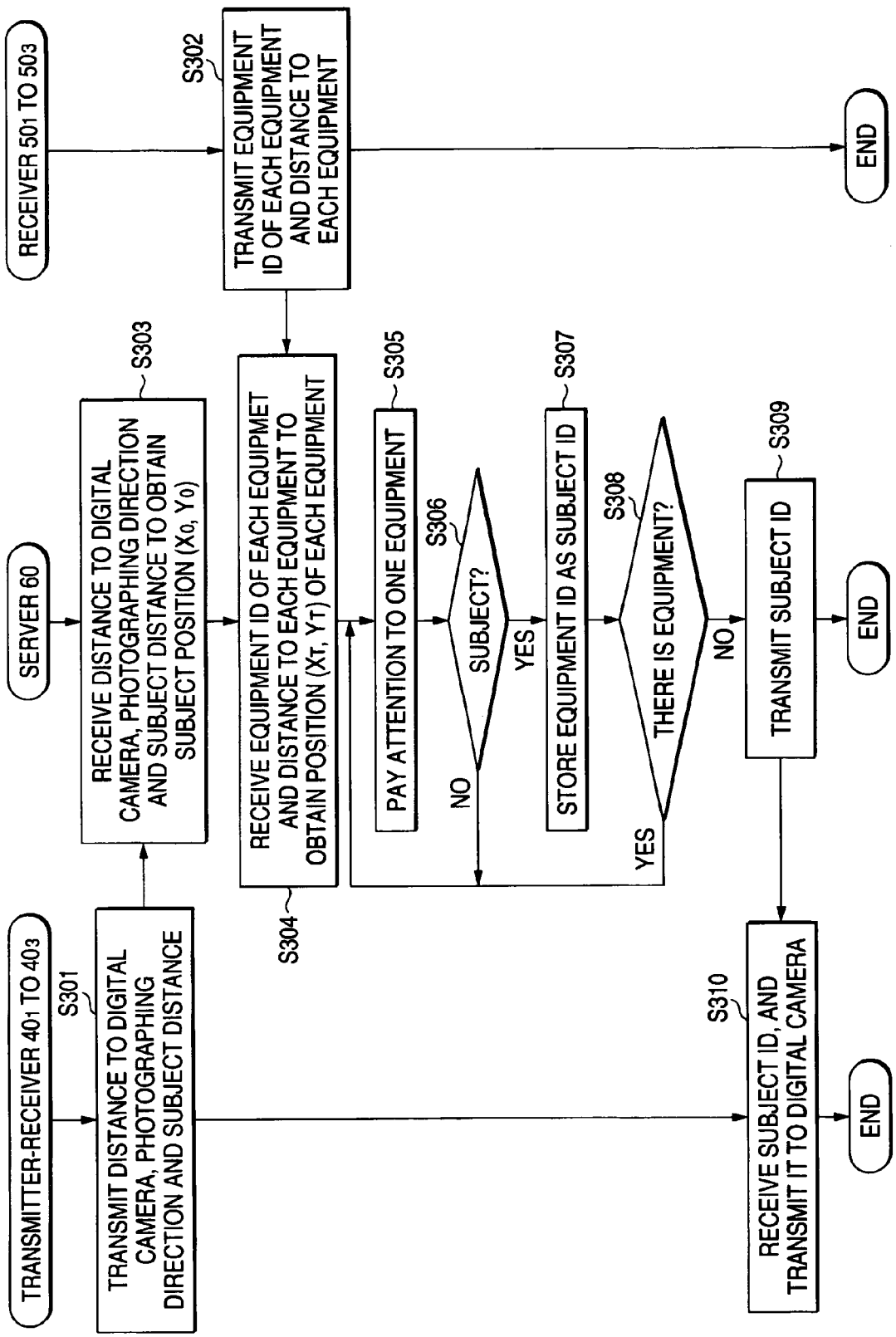

FIG. 18A

| IMAGE ID | ADDITIONAL INFORMATION | | | IMAGE DATA |
|---|---|---|---|---|
| | .... | SUBJECT ID | .... | |
| 01 | .... | 01, 03 | .... | IMAGE DATA OF IMAGE ID01 |
| 02 | .... | 02, 04, 05 | .... | IMAGE DATA OF IMAGE ID02 |
| 03 | .... | 01 | .... | IMAGE DATA OF IMAGE ID03 |
| 04 | .... | 03, 04 | .... | IMAGE DATA OF IMAGE ID04 |
| 05 | .... | 01 | .... | IMAGE DATA OF IMAGE ID05 |
| 06 | .... | 02, 03, 04 | .... | IMAGE DATA OF IMAGE ID06 |
| 07 | .... | 01, 04, 05 | .... | IMAGE DATA OF IMAGE ID07 |
| 08 | .... | 04 | .... | IMAGE DATA OF IMAGE ID08 |
| 09 | .... | 01, 04 | .... | IMAGE DATA OF IMAGE ID09 |
| 10 | .... | 03, 05 | .... | IMAGE DATA OF IMAGE ID10 |

FIG. 18B

| SUBJECT ID | NUMBER OF IMAGE FILES |
|---|---|
| 01 | 5 |
| 02 | 2 |
| 03 | 4 |
| 04 | 6 |
| 05 | 3 |

IMAGE PICKUP APPARATUS AND SUBJECT ID ADDING METHOD

BACKGROUND OF THE INVENTION

1. Field of the Invention

The present invention relates to a technique to record information into additional information added to an image such as a photograph, and particularly to a technique to record information (hereinafter referred to as a "subject ID") to identify a subject into additional information.

2. Description of the Related Art

In recent years, we are flooded with images such as photographs. One of its factors is the rapid popularization of digital cameras (including so-called camera-equipped cellular phones).

In a film-based camera, since an image is recorded on a film using silver halide as a photosensitizer, the image once photographed can not be deleted later. On the other hand, in a digital camera, since an image is recorded as digital data, even if there is a possibility of failure in photographing, the photographing is performed for the time being, and in the case of failure, the image can be deleted later. Besides, with respect to an image on which a judgment of whether it should be stored permanently can be made, the image is saved in a PC (Personal Computer) or the like for the time being, and a judgment of whether it should be deleted or stored is often made later. As stated above, our consciousness becomes greatly different from a case of using a film-based camera, and as a result, there occur such circumstances that many images are scattered in a digital camera, a storage medium, or a hard disk of a PC. Since the images become scattered as stated above, an improvement in handling efficiency of the images has been desired.

For example, in a wedding reception, a handshake meeting of an artist, an athletic meeting of children or the like, photographing service by an exclusive cameraman has been widely performed. With respect to images photographed in such photographing service, in order to eliminate the trouble of mailing them at a later date, it is desirable that they are immediately classified and distributed after the end of the event. However, an operation of such classification and distribution is very difficult. Accordingly, it is requested to improve the handling efficiency of images so that such classification and distribution can be easily performed.

In response to such a request, it is known to provide a system in which a seat code of a seat in a reception is made to correspond to image data of an attendant seated on the seat and they are stored.

However, in the described above system, since the seat code is acquired from an Ir light-emitting device provided on a table, there are problems that it can be applied only to photographing of persons seated on the seats, and an operation of setting up the Ir light-emitting device on the seat is also troublesome.

Furthermore, although it is possible to prevent forgetting to photograph attendants by comparison with the predetermined number of photographs of each table, photographing can not be performed while the number of photographs of all subjects are made equal by displaying the number of photographs of each subject.

SUMMARY OF THE INVENTION

The present invention has been made in view of the above circumstances and provides an image pickup apparatus and a subject ID adding method, an image file with a structure that can be classified according to the subjects is created by a simple structure.

According to an aspect of the present invention, the image pickup apparatus includes an image data acquisition part that acquires image data obtained by photographing a subject, a subject ID acquisition part that acquires, on the basis of a signal obtained from the subject, a subject ID to identify the subject, and a memory that stores the image data acquired by the image data acquisition part and the subject ID acquired by the subject ID acquisition part, the image data and the subject ID being related.

BRIEF DESCRIPTION OF THE DRAWINGS

Embodiments of the invention will be described in detail based on the following figures, wherein:

FIG. 9 is a view showing the whole structure of a system in a third embodiment of the invention;

FIG. 10 is a block diagram showing a functional structure of a server in the third embodiment of the invention;

FIG. 12 is a flowchart showing an operation of the server in the third embodiment of the invention;

FIGS. 18A and 18B are views showing an example of an image file used in the fifth embodiment of the invention and an example of display information created in this embodiment.

DETAILED DESCRIPTION OF THE INVENTION

Hereinafter, embodiments for carrying out the invention will be described in detail with reference to the accompanying drawings.

Figure 1:
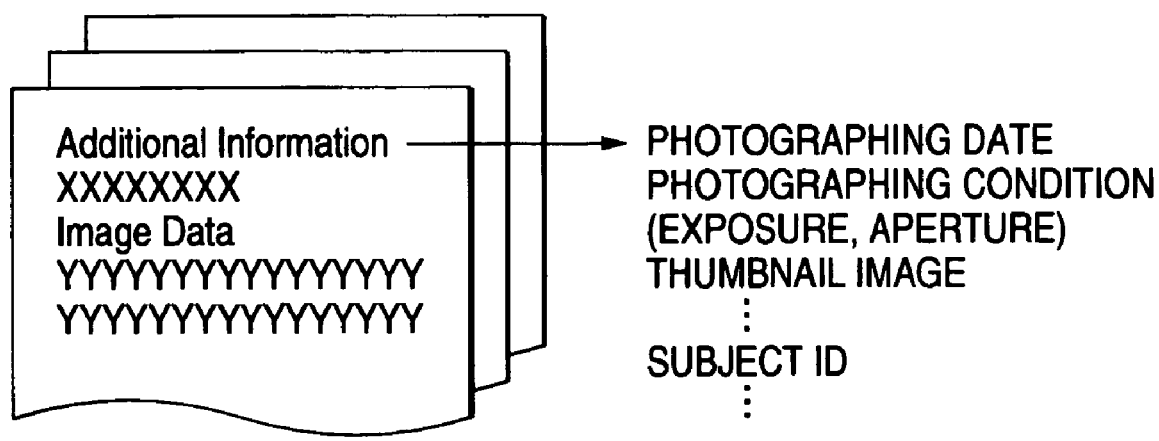
FIG. 1 is a view showing a structure of an image file created in an embodiment of the invention.

FIG. 1 shows an example of a format of an image file obtained by photographing with a digital camera. This shows the format of an image file according to Exif (Exchangeable Image File Format) standards, and additional information such as a photographing date, photographing condition (exposure, aperture) and thumbnail image, together with image data, is stored. Incidentally, Exif is the standards of an image file for a digital camera, which is proposed by Fuji Photo Film Co., Ltd. and is standardized by JEIDA (Japanese Electronic Industry Development Association).

In the Exif standards, an area which can be arbitrarily used by a maker of a digital camera is prepared in the additional information. Accordingly, in this embodiment, as shown in FIG. 1, a subject ID to identify a subject is recorded in this area. By this, for example, it becomes possible to select only an objective subject and to create an electronic album, or to automatically select photographs of the objective subject and to print them.

As a specific method for recording a subject ID into additional information, photographing can be performed after a photographer directly inputs the subject ID to a digital camera, or photographing can be performed after a bar code of a name plate of a subject or an IC tag is scanned by a device attached to a digital camera. Thus, a method described below can be adopted.

In a first embodiment, an equipment ID (for example, serial number) of a shutter remote control, transmitted from each of plural shutter remote controls (remote controller to control a shutter from a remote place) attached to a digital camera is used as a subject ID. That is, the digital camera receives the equipment ID from the shutter remote control and takes an image, so that the subject ID can be easily recorded as additional information.

Incidentally, in the case where there are many subjects, or in the case where it is not desirous to lend the subject the shutter remote control, it is also possible to make the subject have a device of performing only transmission of the subject ID.

Hereinafter, this embodiment will be described in detail.

Figure 2A:
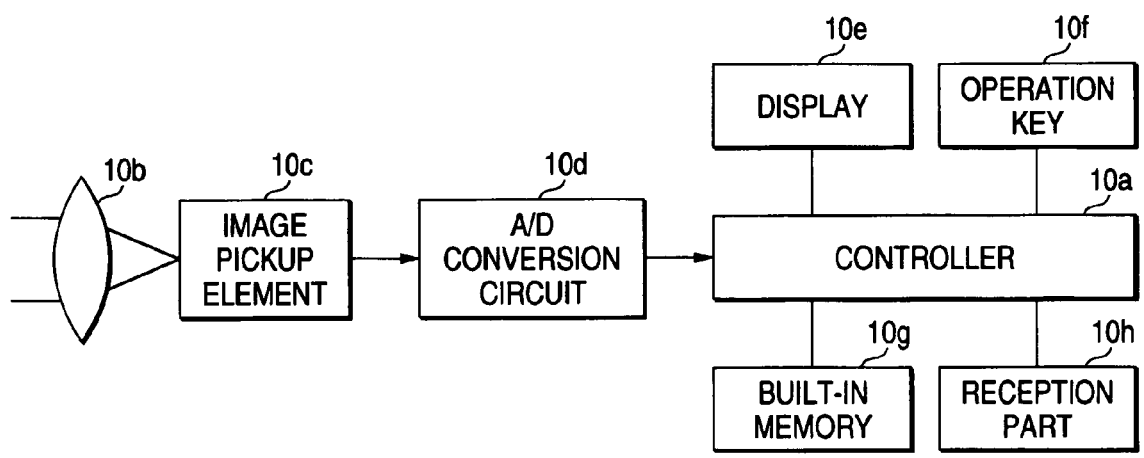
FIGS. 2A and 2B are views showing a hardware structure of a digital camera in a first embodiment of the invention and an outer appearance of a shutter remote control used in this embodiment.

FIG. 2A is a view showing an example of a hardware structure of a digital camera 10 in a first embodiment. The digital camera 10 includes a controller 10a, a lens 10b, an image pickup element 10c, an A/D conversion circuit 10d, a display 10e, an operation key 10f, a built-in memory 10g, and a reception part 10h. Incidentally, this drawing shows the outline, and there is a case where a component which is generally necessary for a digital camera but is not directly relevant to the invention is omitted.

The controller 10a includes a CPU (Central Processing Unit), and is a portion to perform various controls, such as a signal input control from the A/D conversion circuit 10d, a display control for the display 10e, an input control from the operation key 10f, an output control to the built-in memory 10g, and an input control from the reception part 10h. Besides, the CPU has also a function specific to this embodiment described later. Incidentally, although this function can be realized only by hardware, it can also be realized by combination of hardware and software. In the latter case, the CPU of the controller 10a reads, for example, a program stored in the built-in memory 10g and executes it, so that the respective functions are realized.

The lens 10b is for imaging a subject on the image pickup element 10c. The image pickup element 10c is an element to convert light incident through the lens 10b into an electric signal, and is, for example, a CCD (Charge Coupled Diode) or a CMOS (Complementary Metal Oxide Semiconductor). Besides, the A/D conversion circuit 10d is a circuit to convert a signal of image data inputted as an analog signal into a digital signal.

The display 10e is a display to display an image stored in the built-in memory 10g and a menu screen for performing various settings to the digital camera 10. The operation key 10f is a key for performing various setting operations to the digital camera 10. The built-in memory 10g is a memory to store a photographed image and data for performing various settings. The reception part 10h is an element to receive a signal transmitted from a shutter remote control or the like.

Figure 2B:
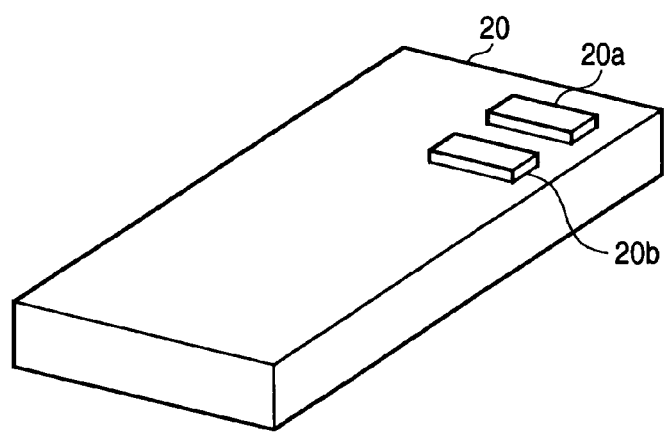

FIG. 2B shows an outer appearance of a foregoing shutter remote control 20. In general, the shutter remote control 20 is provided with a button 20a for performing a shutter control from a remote place. In this embodiment, a button 20b for transmitting an equipment ID is also provided. That is, a person as a subject presses down the button 20b, so that the equipment ID is transmitted to the digital camera 10 by, for example, infrared rays.

Next, a functional structure of the controller 10a will be described with reference to FIG. 3.

Figure 3:
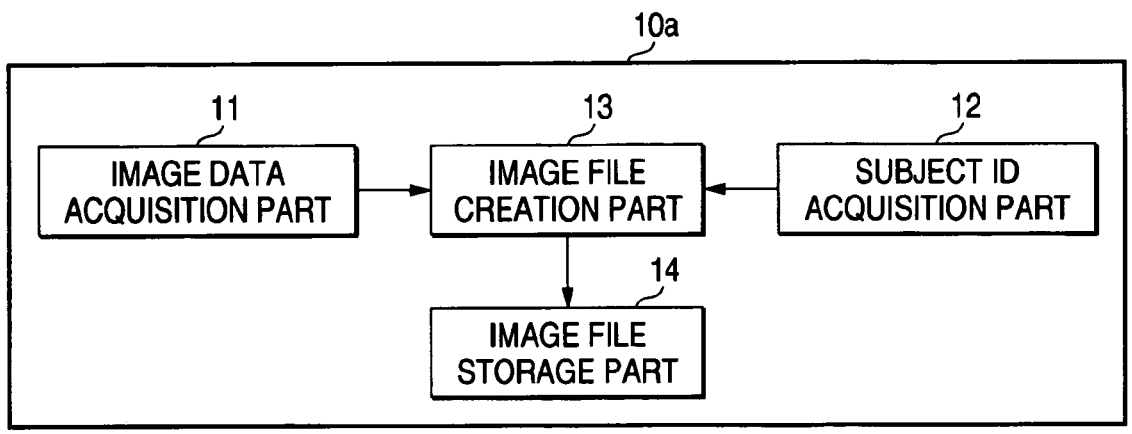
FIG. 3 is a block diagram showing a functional structure of a controller of the digital camera in the first embodiment of the invention.

As shown in FIG. 3, the controller 10a includes an image data acquisition part 11, a subject ID acquisition part 12, an image file creation part 13, and an image file storage part 14. The image data acquisition part 11 is a functional portion to acquire image data as a digital signal delivered from the A/D conversion circuit 10d, and the subject ID acquisition part 12 is a functional portion to acquire a subject ID to be added to the image data. The image file creation part 13 is a functional portion to create an image file by combining the image data delivered from the image data acquisition part 11 and additional information including the subject ID acquired by the subject ID acquisition part 12. The image file storage part 14 is a functional portion to store the image file created by the image file creation part 13 into the built-in memory 10g.

The operation of the controller 10a having the functional structure as stated above will be described with reference to FIG. 4.

Figure 4:
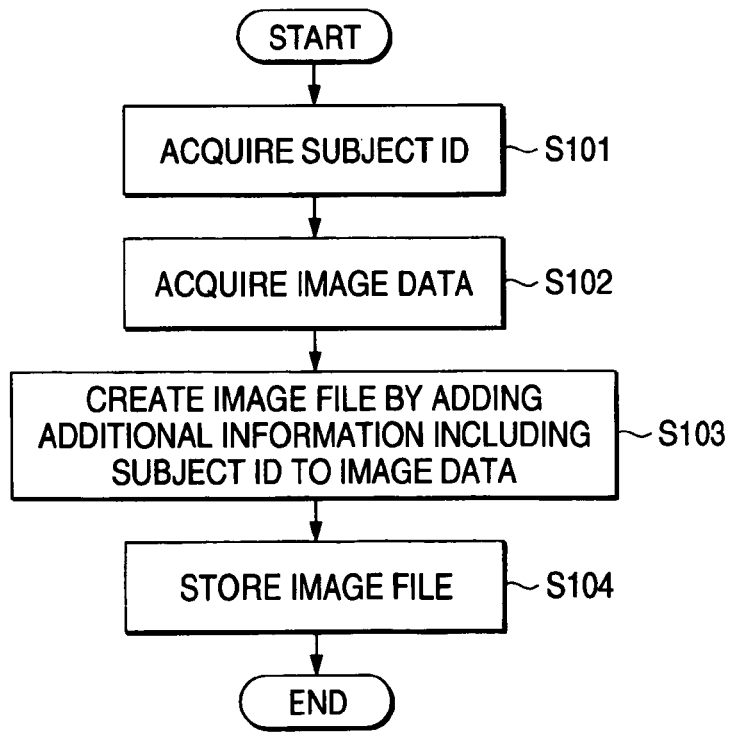
FIG. 4 is a flowchart showing an operation of the controller of the digital camera in the first embodiment of the invention.

As shown in FIG. 4, first, the subject ID acquisition part 12 acquires, as a subject ID, the equipment ID of the shutter remote control 20 received by the reception part 10h (step 101). When photographing is performed, the image data acquisition part 11 acquires the image data from the A/D conversion circuit 10d (step 102). Finally, the image file creation part 13 creates the image file from the additional information acquired at the step 101 and including the subject ID and the image data acquired at the step 102 (step 103), and the image file storage part 14 stores the created image file in the built-in memory 10g (step 104).

In the above description, although the subject ID is acquired by using the shutter remote control 20 or the like, this embodiment can be generally regarded as one which acquires the subject ID by using an equipment transmitting a signal by an operation of a subject.

Besides, by using an equipment spontaneously transmitting a signal without an operation of a subject, the subject ID may be acquired from the spontaneously transmitted signal.

Here, as the spontaneously transmitted signal, the signal transmitted during standby of a cellular phone is conceivable.

Further, in this embodiment, although the photographing is performed after the subject ID is acquired, the subject ID may be acquired after the photographing.

In a second embodiment, a directional signal is transmitted from a digital camera toward a photographing range, and an equipment ID transmitted in response to this signal from a transmitter, such as an IC tag, held by a subject is used as a subject ID. This method is effective in a case where a subject can not be made to perform an operation of transmitting the equipment ID.

However, in this case, there is a possibility that an equipment ID received from a person positioned behind a subject as a photographing object is erroneously recognized as the subject ID. Then, on the basis of a distance from a digital camera to a subject (hereinafter referred to as a "subject distance") and radio field intensity at the time when the equipment ID is received, the equipment ID transmitted from the equipment held by the subject as the photographing object is selected, and the selected equipment ID is made the subject ID.

In the case where the equipment ID is selected from only the subject distance and the radio field intensity, there is also a possibility that an equipment ID transmitted from another equipment whose distance from the digital camera is equal to the subject distance is recognized as the subject ID. Accordingly, plural reception parts are provided, and on the basis of a time difference between received equipment IDs, the equipment ID transmitted from the equipment held by the subject is selected.

Further, based on the time difference between the received equipment IDs, the position of the subject in the composition of a photographed image can be associated with the subject ID and stored. By doing so, only a photograph in which the subject as an object is photographed in the vicinity of the center of the image can be retrieved on the basis of the position information in the additional information. Alternatively, an area in the vicinity of a face of the image is extracted in accordance with the position information, and it becomes possible to judge whether the subject as the object faces forward.

Hereinafter, this embodiment will be described in detail.

Figure 5A:
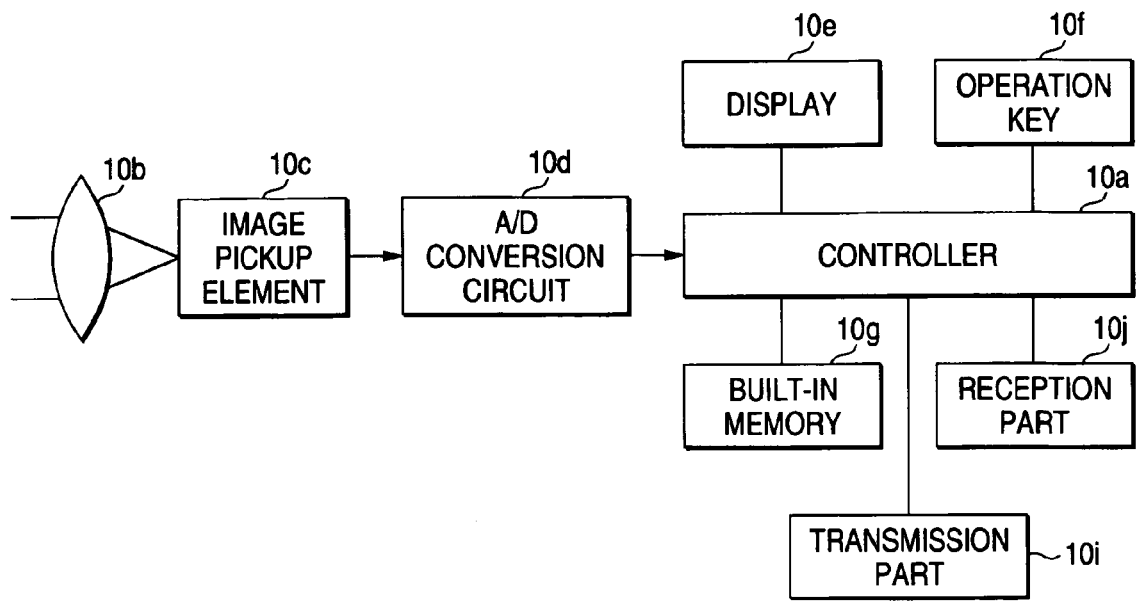
FIGS. 5A to 5C are views showing a hardware structure of a digital camera in a second embodiment of the invention, an outer appearance of the digital camera in the embodiment, and the whole structure of a system in the embodiment.

FIG. 5A is a view showing an example of a hardware structure of a digital camera 10 in the second embodiment. The digital camera 10 includes a controller 10a, a lens 10b, an image pickup element 10c, an A/D conversion circuit 10d, a display 10e, an operation key 10f, a built-in memory 10g, a transmission part 10i, and a reception part 10j. Incidentally, this drawing shows the outline, and there is a case where a component which is generally necessary for a digital camera but is not directly relevant to the invention is omitted.

Since the controller 10a, the lens 10b, the image pickup element 10c, the A/D conversion circuit 10d, the display 10e, the operation key 10f and the built-in memory 10g are similar to those described in the first embodiment, their description will be omitted. The transmission part 10i is an element to request the equipment held by the subject to transmit the equipment ID, and in the case where an IC tag is used as the equipment held by the subject, it corresponds to a loop antenna. The reception part 10j is an element to receive the equipment ID transmitted from the equipment held by the subject.

Figure 5B:
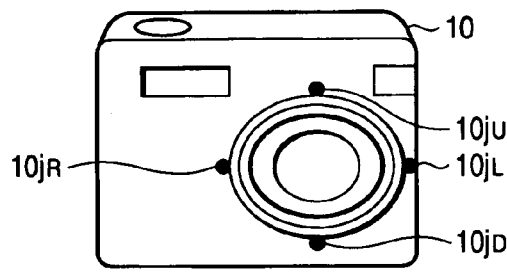

In this embodiment, as described above, the digital camera 10 provided with the plural reception parts 10j is used. FIG. 5B shows the outer appearance. In the case where the camera is held in the state shown in FIG. 5B and photographing is performed (in the case where the camera is held in the horizontal direction and photographing is performed), a reception part $10j_L$ and a reception part $10j_R$ receive a signal transmitted from an equipment. On the other hand, in the case where the camera is held in a state where it is rotated by 90° from the state shown in FIG. 5B and photographing is performed (in the case where the camera is held in the vertical direction and photographing is performed), a reception part $10j_U$ and a reception part $10j_D$ receive a signal transmitted from an equipment. Incidentally, it is possible to judge by a well-known posture detector whether the camera is held in the vertical direction or the horizontal direction. Incidentally, in the following description, the "reception part 10j" indicates one of the reception part $10j_L$, the reception part $10j_R$, the reception part $10j_U$ and the reception part $10j_D$.

Figure 5C:
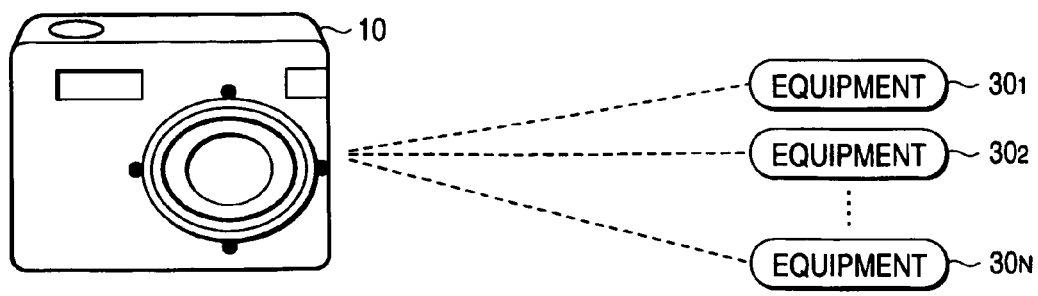

FIG. 5C shows a system structure in this embodiment.

FIG. 5C shows a state in which the digital camera 10 performs information communication with equipments $30_1$ to $30_N$ such as IC tags. Incidentally, in the following description, when an explanation is made while one equipment of the plural equipments is used as a representative, it is called also the "equipment 30".

Next, a functional structure of the controller 10a will be described with reference to FIG. 6.

Figure 6:
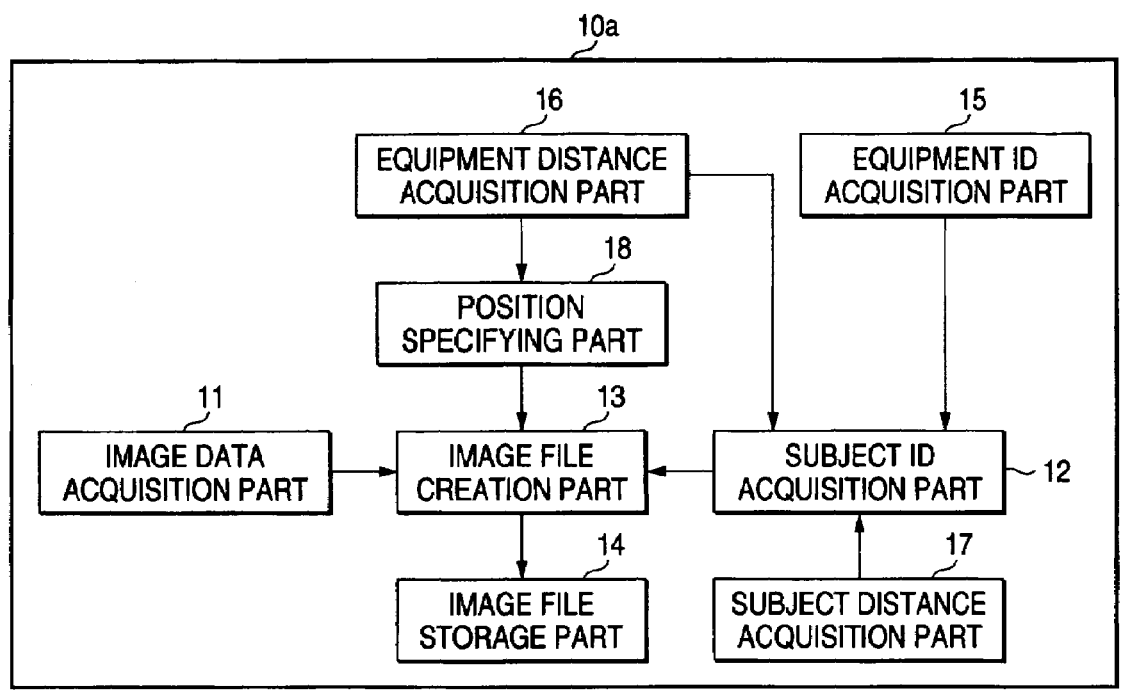
FIG. 6 is a block diagram showing a functional structure of a controller of the digital camera in the second embodiment of the invention.

As shown in FIG. 6, the controller 10a includes an image data acquisition part 11, a subject ID acquisition part 12, an image file creation part 13, an image file storage part 14, an equipment ID acquisition part 15, an equipment distance acquisition part 16, a subject distance acquisition part 17, and a position specifying part 18.

Since the image data acquisition part 11, the subject ID acquisition part 12, the image file creation part 13 and the image file storage part 14 are similar to those described in the first embodiment, their description will be omitted. The equipment ID acquisition part 15 is a functional portion to receive an equipment ID through the reception part 10j, and the equipment distance acquisition part 16 is a functional portion to acquire information necessary to grasp a distance to the equipment 30. The subject distance acquisition part 17 is a functional portion to acquire information of the distance from the digital camera 10 to the subject, and the position specifying part 18 is a functional portion to specify the position of the subject in the composition.

The operation of the controller 10a having the functional structure as stated above will be described with reference to FIGS. 7 and 8.

Figure 7:
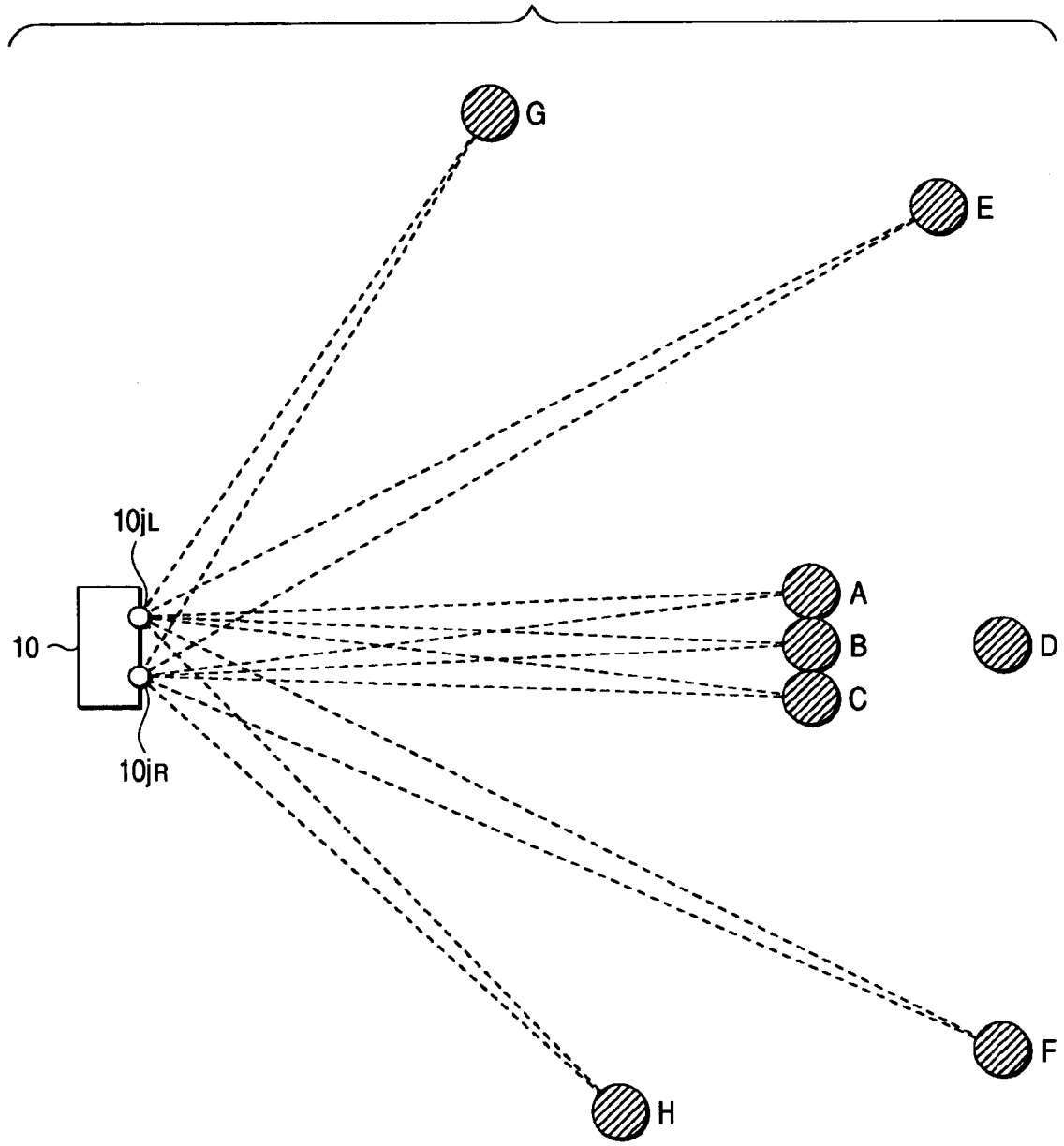
FIG. 7 is a view for explaining an operation in the second embodiment of the invention.

FIG. 7 is a view shown from above and showing a state in which persons A to C among persons A to H are the subjects and are photographed by the digital camera 10. Each of the persons A to H has the equipment 30 such as the IC tag. Incidentally, here, since it is assumed that the digital camera 10 is held in the horizontal direction, only the reception part $10j_L$ and the reception part $10j_R$ are illustrated as the reception part 10j.

In FIG. 7, the distance from the digital camera 10 to the point where the persons A to C are positioned is the subject distance. Accordingly, since the distances from the digital camera 10 to the persons D, E and F are different from the subject distance, it is judged that they are not the subjects. Although the distances from the digital camera 10 to the persons G and H are almost equal to the subject distance, since a time difference of a given time or more occurs between the reception of the equipment ID by the reception part $10j_L$ and the reception of the equipment ID by the reception part $10j_R$, it is judged that they are not the subjects.

A specific operation will be described in detail with reference to a flowchart of FIG. 8.

Figure 8:
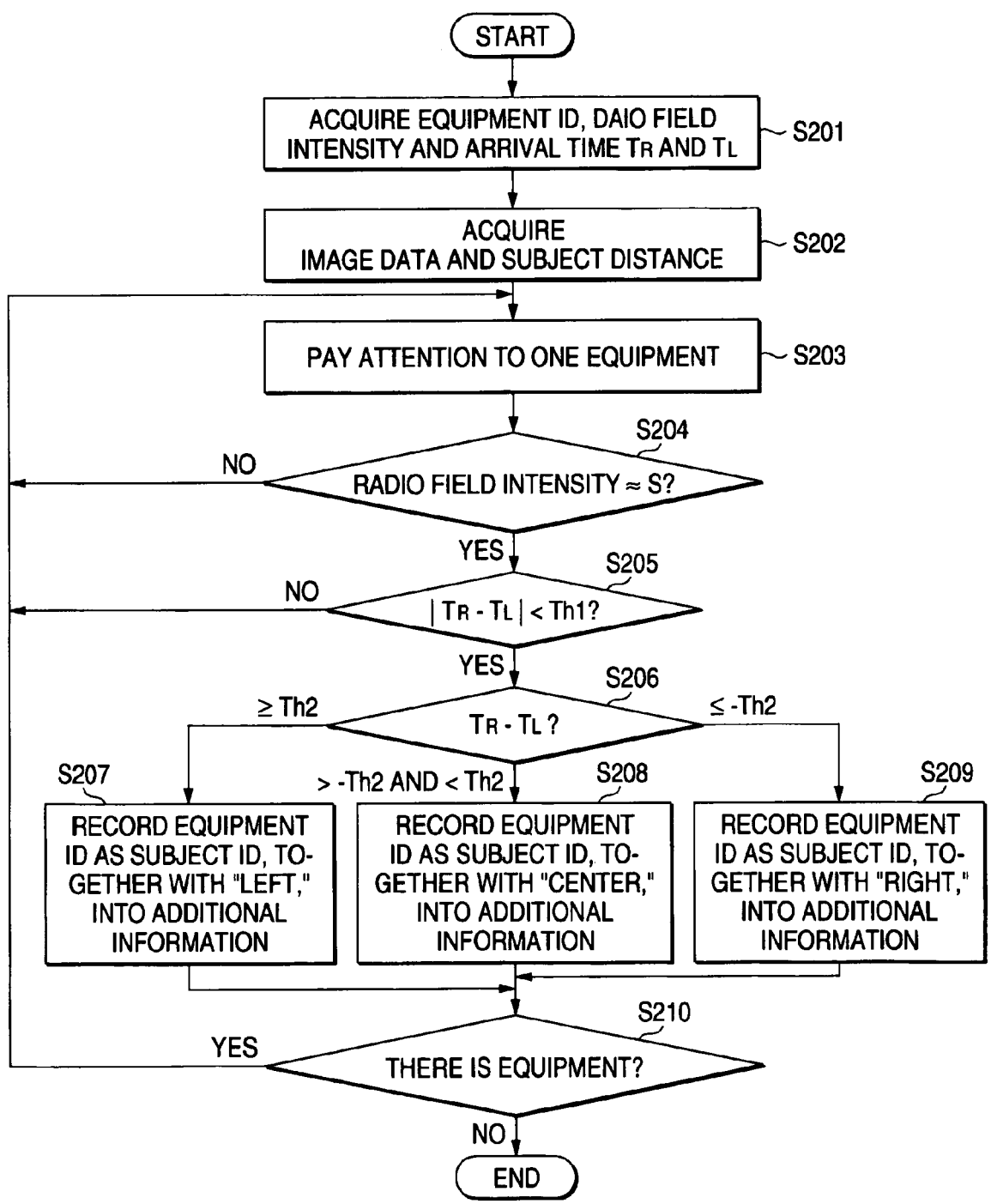
FIG. 8 is a flowchart showing an operation of the controller of the digital camera in the second embodiment of the invention.

As shown in FIG. 8, first, the equipment ID acquisition part 15 acquires equipment IDs received by the reception part 10*j* from all the equipments 30, and the equipment distance acquisition part 16 acquires, for each of the equipment IDs, radio field intensity at the time when the equipment ID is received, an arrival time $T_R$ to the reception part $10j_R$, and an arrival time $T_L$ to the reception part $10j_L$ (step 201). When photographing is performed, the image data acquisition part 11 acquires image data from the A/D conversion circuit 10*d*, and the subject distance acquisition part 17 acquires the subject distance obtained at the time of the photographing (step 202).

Next, the subject ID acquisition part 12 pays attention to one equipment 30 held by one person (step 203). It is judged whether the radio field intensity acquired by the equipment distance acquisition part 16 is almost equal to a theoretical value S of the radio field intensity determined according to the subject distance acquired by the subject distance acquisition part 17 (step 204). As a result, in the case where it is judged that the radio field intensity is almost equal to the theoretical value S, there is a high possibility that the person is the subject, and accordingly, the procedure proceeds to step 205. Incidentally, here, whether "they are almost equal" can be judged by, for example, checking whether a difference between the acquired radio field intensity and the theoretical value S is a given threshold value or less.

Next, the subject ID acquisition part 12 judges whether the time difference between the arrival time $T_R$ and the arrival time $T_L$ is smaller than a threshold value Th1 (step 205). As a result, in the case where it is judged that the time difference is smaller than the threshold value Th1, since there is a possibility that the person exists in the photographing range of the camera and is the subject, the procedure proceeds to step 206.

Besides, the position specifying part 18 evaluates the value of the time difference between the arrival time $T_R$ and the arrival time $T_L$ (step 206).

First, in the case where "$T_R-T_L$" is a threshold value "Th2" or more, the position specifying part 18 recognizes that the position of the subject in the composition is in the "left". The image file creation part 13 creates an image file by adding additional information including the equipment ID and the position information "left" to the image data, and the image file storage part 14 stores the created image file into the built-in memory 10*g* (step 207).

In the case where "$T_R-T_L$" is larger than the threshold value "−Th2" and smaller than "Th2", the position specifying part 18 recognizes that the position of the subject in the composition is in the "center". The image file creation part 13 creates an image file by adding additional information including the equipment ID and the position information "center" to the image data, and the image file storage part 14 stores the created image file into the built-in memory 10*g* (step 208).

Further, in the case where "$T_R-T_L$" is a threshold value "−Th2" or less, the position specifying part 18 recognizes that the position of the subject in the composition is in the "right". The image file creation part 13 creates an image file by adding additional information including the equipment ID and the position information "right" to the image data, and the image file storage part 14 stores the created image file into the built-in memory 10*g* (step 209).

Finally, it is judged whether there is another person (equipment) (step 210). In the case where it is judged that there is no other person (equipment), the processing is ended. In the case where it is judged that there is another person (equipment), attention is paid to a next person (equipment), and the processing of the steps 204 to 209 is repeated. Besides, at the step 204, also in the case where the radio field intensity is very different from the theoretical value S, or in the case where the time difference between the arrival time $T_R$ and the arrival time $T_L$ is not smaller than the threshold value Th1, attention is paid to a next person (equipment), and the processing of the steps 204 to 209 is repeated.

Incidentally, in this embodiment, although the distance from the digital camera 10 to the equipment 30 is estimated based on the radio field intensity, the distance maybe estimated based on, for example, the time to the reception of the signal transmitted from the equipment 30.

Besides, although the direction of the equipment 30 viewed from the digital camera 10 is estimated based on the time difference between the arrival times of the signals by using the plural reception parts 10*j*, it may be estimated based on any difference in reception states of the plural reception parts 10*j*.

Further, the method in this embodiment for specifying the signal received from the equipment 30 held by the subject among the signals received from the plural equipments 30 can also be applied to the first embodiment.

Further, in this embodiment, since it is assumed that the subject is a human being, the subject ID is extracted from the signal transmitted from the equipment 30 held by subject. However, in the case where the subject is not a human being, the subject ID may be extracted from a signal transmitted from the subject itself.

A third embodiment is applied to photographing in a limited space, for example, like a reception hall. Each person is made to have a name plate in which an equipment such as an IC tag is embedded, and an equipment ID of the equipment held by each person and a position of each person in a room are grasped by plural receivers. A position of a subject is estimated from the position information of a digital camera, a photographing direction and a subject distance, and the equipment ID transmitted from the subject is selected among plural equipment IDs and is acquired as the subject ID.

By the structure as stated above, it becomes unnecessary to provide a device to transmit a detection wave and a device to receive a signal in a digital camera. However, when the device to transmit the detection wave and the device to receive the signal are combined and used, the subject ID can be acquired with higher accuracy.

Hereinafter, this embodiment will be described in detail.

FIG. 9 is a view showing the whole structure of a system in the third embodiment. This system includes a digital camera 10, equipments $30_1$ to $30_N$, transmitter-receivers $40_1$ to $40_3$, receivers $50_1$ to $50_3$, and a server computer (hereinafter referred to as a "server") 60.

The digital camera 10 has a structure similar to that shown in the second embodiment, transmits information to the transmitter-receivers $40_1$ to $40_3$ through a transmission part 10*i*, and receives information from the transmitter-receivers $40_1$ to $40_3$ by a reception part 10*j*. The equipments $30_1$ to $30_N$ transmit information to the receivers $50_1$ to $50_3$, and are, for example, IC tags.

The transmitter-receivers $40_1$ to $40_3$ receive information of a photographing direction and a subject distance from the digital camera 10, measure distances to the digital camera 10 on the basis of, for example, the radio field intensity at the time of reception, and transmit the obtained information to the server 60. Besides, the transmitter-receivers have a function to transmit information sent from the server 60 to the digital camera 10. Incidentally, in the following description, when the description is made while one transmitter-receiver is used as a representative of the plural transmitter-receivers, it is called the "transmitter-receiver 40".

The receivers $50_1$ to $50_3$ receive equipment IDs from the respective equipments 30, measure distances to the respective equipments 30 on the basis of, for example, the radio field intensity at the time of reception, and transmit the obtained information to the server 60. Incidentally, in the following description, when the description is made while one receiver is used as a representative of the plural receivers, it is called the "receiver 50".

The server 60 has a function to calculate the position of the digital camera 10 on the basis of the distances to the digital camera 10 received from the transmitter-receivers $40_1$ to $40_3$, and to specify the position of the subject in view of the received photographing direction and the subject distance. Besides, the server calculates the positions of the respective equipments $30_1$ to $30_N$ on the basis of the distances to the respective equipments $30_1$ to $30_N$ received from the receivers $50_1$ to $50_3$, specifies the equipment at the position of the subject among them, and transmits the equipment ID of the equipment as the subject ID to the transmitter-receiver 40.

Incidentally, in the server 60, since the position of the digital camera is calculated based on the distance to the digital camera 10, the three transmitter-receivers 40 are set up. However, four or more transmitter-receivers may be set up in order to more improve the accuracy. Besides, in the server 60, since the positions of the equipments 30 are calculated based on the distances to the respective equipments 30, the three receivers 50 are set up. However, four or more receives may be set up in order to more improve the accuracy.

Next, a functional structure of the server 60 will be described with reference to FIG. 10.

As shown in FIG. 10, the server 60 includes a subject position specifying part 61, an equipment ID acquisition part 62, an equipment position specifying part 63, a subject ID acquisition part 64, and a subject ID transmission part 65.

The subject position specifying part 61 is a functional portion to specify the position of the subject on the basis of the information acquired from the digital camera 10. The equipment ID acquisition part 62 is a functional portion to acquire the equipment IDs transmitted from the respective equipments 30, and the equipment position specifying part 63 is a functional portion to specify the positions of the respective equipments 30. The subject ID acquisition part 64 is a functional portion to specify the equipment ID of the equipment 30 at the position specified by the subject position specifying part 61 among the equipment IDs acquired by the equipment ID acquisition part 62, and to acquire the equipment ID as the subject ID. The subject ID transmission part 65 is a functional portion to transmit the acquired subject ID to the transmitter-receiver 40.

The operation of the server 60 having the functional structure as stated above will be described with reference to FIGS. 11 and 12.

Figure 11:
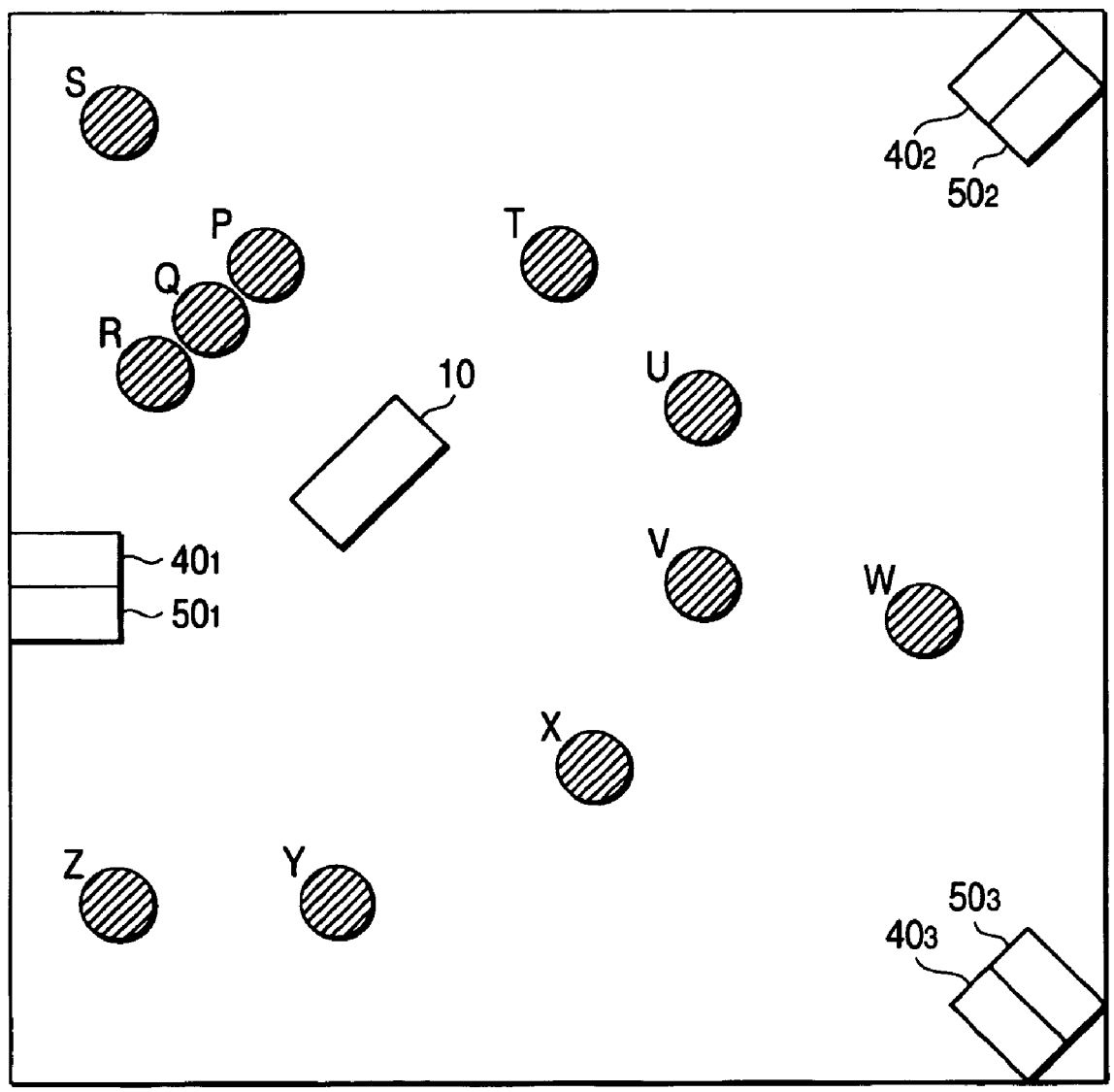
FIG. 11 is a view for explaining an operation in the third embodiment of the invention.

FIG. 11 is a view shown from above and showing a state in which persons P to R among persons P to Z are subjects and are photographed by the digital camera 10. Each of the persons P to Z has the equipment 30 such as the IC tag.

In FIG. 11, the position where the persons P to R exist is the position where the subject exists (hereinafter referred to as the "subject position"). Accordingly, since the positions where the persons S to Z exist are different from the subject position, it is judged that they are not the subjects.

A specific operation will be described in detail with reference to a flowchart of FIG. 12.

First, the transmitter-receivers $40_1$, $40_2$ and $40_3$ receive the photographing direction and the subject distance from the digital camera 10, and obtains distances $D_{C1}$, $D_{C2}$ and $D_{C3}$ to the digital camera 10 on the basis of the radio field intensity at the time of reception. The information obtained is transmitted to the server 60 (step 301). The transmitter-receivers $40_1$, $40_2$ and $40_3$ are constructed to receive the information from the digital camera 10 and to transmit it to the server 60 at the time point when the photographing by the digital camera 10 is performed.

On the other hand, the receivers $50_1$, $50_2$ and $50_3$ receive the equipment ID from the equipment 30 held by each person, and obtain distances $Dt_1$, $Dt_2$ and $Dt_3$ to the equipment 30 on the basis of the radio field intensity at the time of reception. The information obtained is transmitted to the server 60 (step 302). Incidentally, since it is conceivable that each person does not stay at the same position for a long time, it is necessary that the receivers $50_1$, $50_2$ and $50_3$ are constructed to receive information from the equipment 30 at regular time intervals and to transmit it to the server 60.

In response thereto, in the server 60, the subject position specifying part 61 acquires the distances $D_{C1}$, $D_{C2}$ and $D_{C3}$ to the digital camera 10, the photographing direction, and the subject distance, and specifies the position of the digital camera 10 on the basis of the distances $D_{C1}$, $D_{C2}$ and $D_{C3}$, and further obtains a subject position $(X_0, Y_0)$ on the basis of the photographing direction and the subject distance (step 303). Besides, the equipment ID acquisition part 62 acquires the equipment IDs of the respective equipments 30. The equipment position specifying part 63 acquires the distances $Dt_1$, $Dt_2$ and $Dt_3$ to the respective equipments 30, and obtains positions $(X_T, Y_T)$ of the respective equipments 30 on the basis of the distances (step 304). Incidentally, in this case, as the information of the equipment 30, the information at the photographing time in the digital camera 10 is used among information received from the receivers $50_1$, $50_2$ and $50_3$ at regular time intervals.

Next, the subject ID acquisition part 64 pays attention to one equipment 30 held by one person (step 305). Then, it is judged whether this equipment 30 is held by the subject, that is, whether the position $(X_T, Y_T)$ of the equipment 30 specified by the equipment position specifying part 63 is close to the subject position $(X_0, Y_0)$ (step 306). As a result, in the case where the position $(X_T, Y_T)$ of the equipment 30 is close to the subject position $(X_0, Y_0)$, the equipment ID of the equipment 30 is stored as the subject ID (step 307).

Finally, it is judged whether there is another person (equipment) (step 308). In the case where it is judged that there is another person (equipment), attention is paid to a next person (equipment), and the processing of the steps 306 and 307 is repeated. Also in the case where it is judged at the step 306 that the equipment 30 is not held by the subject, attention is paid to a next person (equipment), and the processing of the steps 306 and 307 is repeated.

In the case where it is judged at the step 308 that there is no person (equipment), the subject ID transmission part 65 transmits all subject IDs stored at the step 307 to the transmitter-receiver 40 (step 309), and the transmitter-receiver 40 transmits the subject IDs to the digital camera 10 (step 310).

Incidentally, in this embodiment, although the digital camera 10 recognizes the photographing direction and transmits it to the transmitter-receivers $40_1$, $40_2$ and $40_3$, it is also possible to recognize the photographing direction by using another method. For example, a method is conceivable in which a detector to detect a signal from the digital camera 10 is provided on the wall of a room as a photographing place, and the photographing direction is recognized by the reaction of the detector.

Besides, in this embodiment, from the viewpoint that an accurate position may be grasped with respect to the digital camera 10, and a rough position may be grasped with respect to the equipment 30 held by each person, the transmitter-receivers 40₁, 40₂ and 40₃ and the receivers 50₁, 50₂ and 50₃ are separately provided. However, these may be unified and provided.

Further, in this embodiment, since it is assumed that the subject is a human being, the subject ID is extracted from the signal transmitted from the equipment 30 held by the subject. However, in the case where the subject is not a human being, the subject ID may be extracted from a signal transmitted from the subject itself.

According to a fourth embodiment, a subject, together with a name plate on which characters or a bar code is provided, is photographed, a subject ID is created from information extracted from a photographed image to form additional information, and it is stored together with the image data.

By the structure as stated above, it becomes possible to automatically acquire the subject ID at the same time as the photographing. Besides, it is possible to prevent the subject ID from being erroneously extracted from an image of a remote person or the like, which is out of focus.

Hereinafter, this embodiment will be described in detail.

Figure 13A:
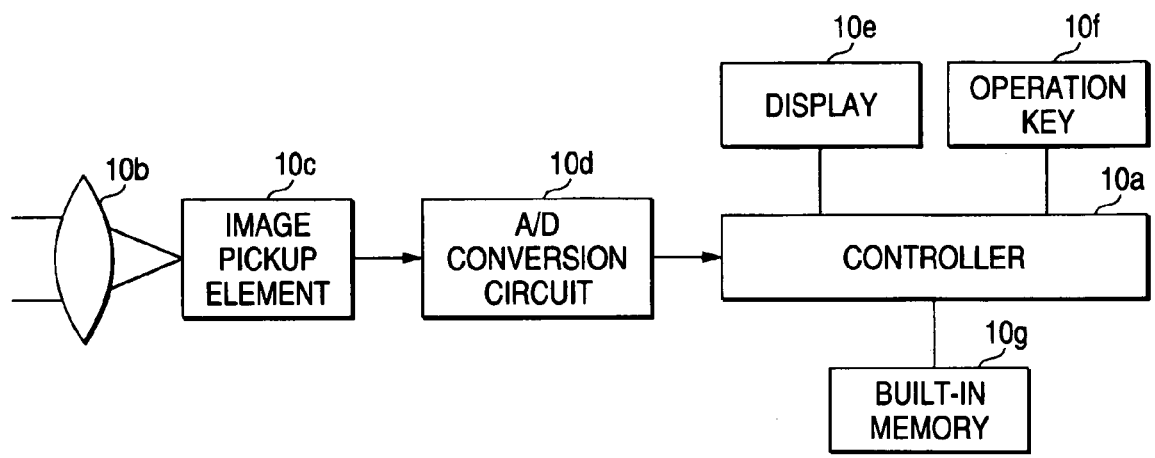
FIG. 13A is a view showing a hardware structure of a digital camera in a fourth embodiment of the invention.

FIG. 13A is a view showing an example of a hardware structure of a digital camera 10 in the fourth embodiment. The digital camera 10 includes a controller 10a, a lens 10b, an image pickup element 10c, an A/D conversion circuit 10d, a display 10e, an operation key 10f, and a built-in memory 10g. Incidentally, this drawing shows the outline, and there is a case where a component which is generally necessary for a digital camera but is not directly relevant to the invention is omitted. Besides, all the functions are similar to those described in the first and the second embodiments, their description will be omitted.

Figure 13B:
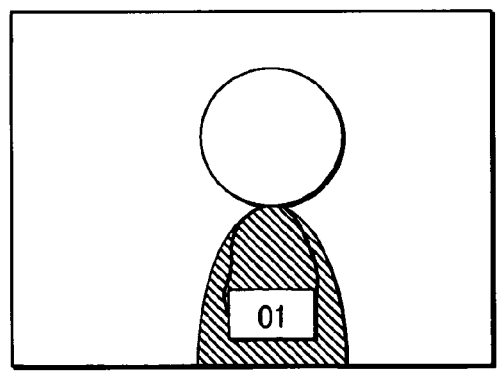
FIG. 13B is a view showing an example of an image to be analyzed in the embodiment.

FIG. 13B is a view showing an example of an image to be analyzed in this embodiment. As shown in the drawing, the subject is made to have a name plate or the like which is constructed such that image analysis is easily performed, and photographing is performed.

Next, a functional structure of the controller 10a will be described with reference to FIG. 14.

Figure 14:
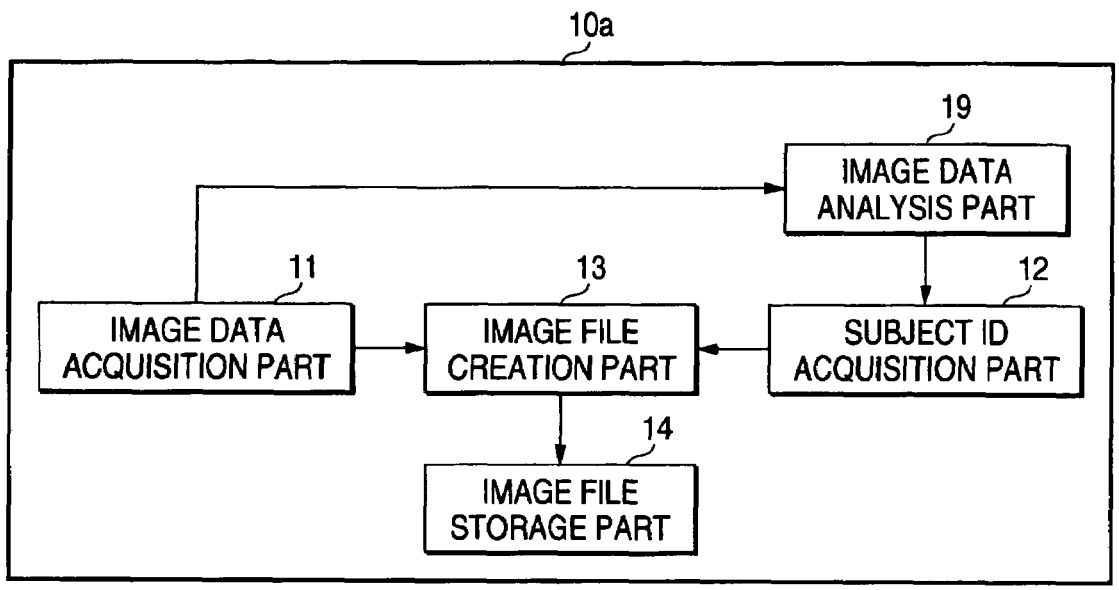
FIG. 14 is a block diagram showing a functional structure of a controller of the digital camera in the fourth embodiment of the invention.

As shown in FIG. 14, the controller 10a includes an image data acquisition part 11, a subject ID acquisition part 12, an image file creation part 13, an image file storage part 14, and an image data analysis part 19.

Since the image data acquisition part 11, the subject ID acquisition part 12, the image file creation part 13, and the image file storage part 14 are the same as those of the first embodiment and the second embodiment, their description will be omitted. The image data analysis part 19 is a functional portion to analyze image data acquired by the image data acquisition part 11 and to extract a subject ID.

Figure 15:
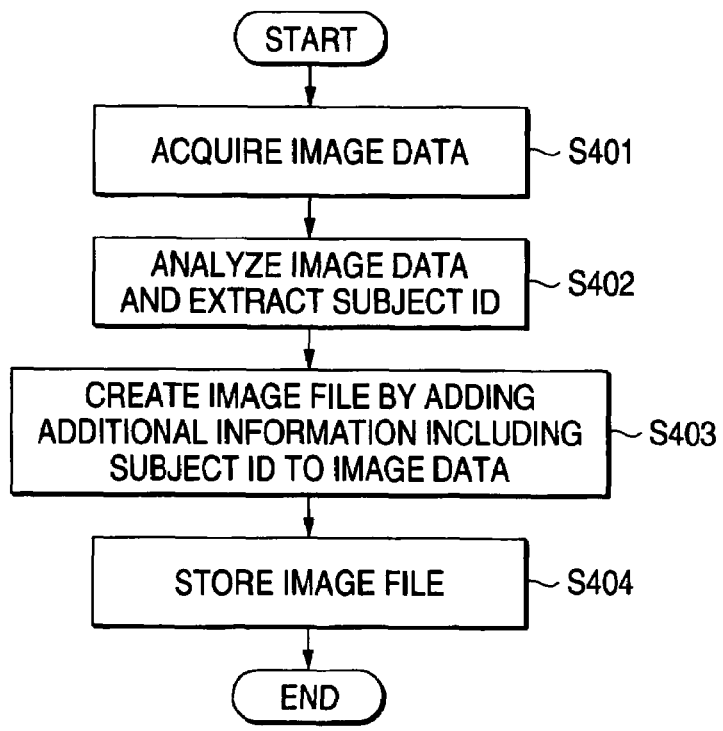
FIG. 15 is a flowchart showing an operation of the controller of the digital camera in the fourth embodiment of the invention.

The operation of the controller 10a having the functional structure as stated above will be described with reference to FIG. 15.

When photographing is performed, the image data acquisition part 11 acquires the image data from the A/D conversion circuit 10d (step 401). By this, the image data analysis part 19 analyzes the acquired image data, and extracts the subject ID by using a well-known method (step 402). Finally, the image file creation part 13 creates an image file from the image data acquired at the step 401 and additional information including the subject ID acquired at the step 402 (step 403), and the image file storage part 14 stores the created image file into the built-in memory 10g (step 404).

In a fifth embodiment, a processing is performed using a subject ID recorded in additional information by the methods described in the first to the fourth embodiment or other methods. That is, a digital camera 10 captures the subject ID, so that the number of photographs for each subject ID can be confirmed during photographing.

By the structure as stated above, it becomes possible to confirm variations in the number of photographs for each subject, or to prevent forgetting of photographing.

Since a hardware structure of the digital camera 10 in this embodiment is the same as those shown in the first to the fourth embodiments, the description will be omitted, and a functional structure of a controller 10a will be described.

Figure 16:
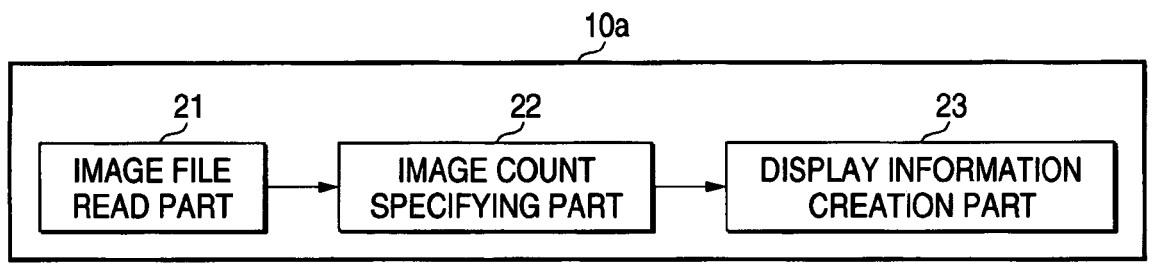
FIG. 16 is a block diagram showing a functional structure of a controller of a digital camera in a fifth embodiment of the invention.

As shown in FIG. 16, the controller 10a includes an image file read part 21, an image count specifying part 22, and a display information creation part 23.

The image file read part 21 is a functional portion to read an image file from the built-in memory 10g, and the image count specifying part 22 is a functional portion to specify the number of images for each subject ID, in which the subject corresponding to the subject ID is photographed. The display information creation part 23 is a functional portion to create information for displaying the number of images for each subject ID on the display 10e of the digital camera 10.

Figure 17:
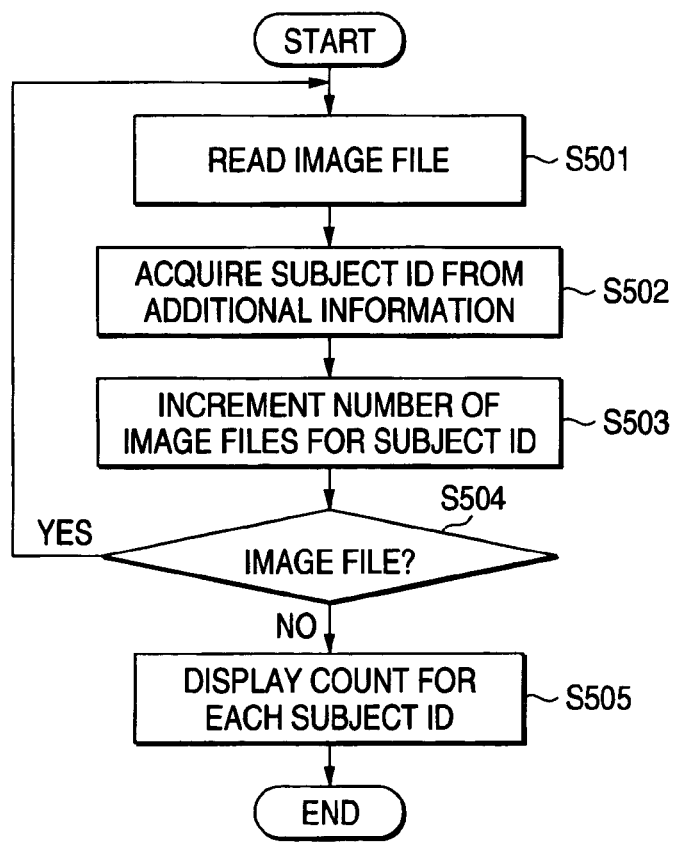
FIG. 17 is a flowchart showing an operation of the controller of the digital camera in the fifth embodiment of the invention.

The operation of the controller 10a having the functional structure as stated above will be described with reference to FIG. 17.

First, the image file read part 21 reads one image file from the built-in memory 10g (step 501). Next, the image count specifying part 22 acquires the subject ID from the additional information included in the image file (step 502). With respect to the acquired subject ID, the count of the number of image files is incremented by one, and it is stored in the built-in memory 10g (step 503). In the case where plural subject IDs are acquired from the additional information, with respect to all of them, the count of the number of image files is incremented by one. Then, it is judged whether there is an image file which has not been processed (step 504).

As a result, when there is an unprocessed image file, the procedure returns to step 501. On the other hand, when there is no unprocessed image file, the display information creation part 23 creates display information on the basis of the count for each subject stored in the built-in memory 10g at the time point, and displays it on the display 10e of the digital camera 10 (step 505).

The above operation will be specifically described while an image file as shown in FIG. 18A is used as an example.

First, with respect to an image file with an image ID "01", the processing of the steps 501 to 503 is performed, and the count of subject IDs "01" and "03" become "1". Next, with respect to an image file with an image ID "02", the processing of the steps 501 to 503 is performed, and the count of subject IDs "02", "04" and "05" become "1". Further, with respect to an image file with an image ID "03", the processing of the steps 501 to 503 is performed, and the count of the subject ID "01" becomes "2". Hereinafter, similarly, the processing of the steps 501 to 503 is performed also with respect to image files with image IDs "04" to "10", and the counting result of the number of image files is obtained as shown in FIG. 18B.

Incidentally, although the display information creation part 23 may directly adopt one shown in FIG. 18B as the display information, what is obtained by applying a processing, such as graphing, to one shown FIG. 18B may be made the display information.

As described above, in this embodiment, the subject ID is acquired from the signal transmitted from the subject and is recorded in the additional information of the image data. By this, even if the subjects are not seated on the seats, the image file with the structure which can be classified according to the subjects can be created by the simple structure.

As described above, some embodiments of the invention are outlined below.

In an embodiment of the invention, a subject ID is acquired from a signal obtained from a subject, and is made to be added to image data. That is, according to the embodiment of the invention, the image pickup apparatus includes an image data acquisition part that acquires image data obtained by photographing a subject, a subject ID acquisition part that acquires, on the basis of a signal obtained from the subject, a subject ID to identify the subject, and a memory that stores the image data acquired by the image data acquisition part and the subject ID acquired by the subject ID acquisition part the image data and the subject ID being related.

In the image pickup apparatus, the subject ID acquisition part may acquire the subject ID on the basis of the signal transmitted from an equipment held by the subject.

In the image pickup apparatus, the subject ID acquisition part may acquire the subject ID on the basis of the signal transmitted from the equipment by an operation of the subject.

In the image pickup apparatus, the subject ID acquisition part may acquire a serial number of a remote controller transmitted from the remote controller to enable photographing of the subject to be performed by an operation of the subject itself.

In the image pickup apparatus, the subject ID acquisition part may acquire the subject ID on the basis of the signal transmitted from the equipment spontaneously without an operation of the subject.

The image pickup apparatus may further include a transmitter that transmits a transmission request of the subject ID to the equipment, and the subject ID acquisition part may acquire the subject ID on the basis of the signal transmitted from the equipment in response to the transmission request transmitted by the transmitter.

The image pickup apparatus may further include a distance acquisition part that acquires a distance to the subject obtained when the subject is photographed, and the subject ID acquisition part may specify, among signals obtained from plural objects, a signal from the subject by comparing a distance to each of the objects with the distance acquired by the distance acquisition part.

In the image pickup apparatus, the subject ID acquisition part may specify, among signals obtained from plural objects, a signal from the subject by comparing a direction of each of the objects with a front direction of photographing.

The image pickup apparatus may further include plural receivers that receive signals transmitted from the respective objects, and the subject ID acquisition part may specify the direction of each of the objects on the basis of a difference between reception states of the signals by the respective receivers.

The image pickup apparatus may further include a position specifying part to specify a position of the subject on the image data by comparing a direction of the subject with a front direction of photographing, and the memory may store the image data and information indicating the position specified by the position specifying part, the image data and the information being related.

Besides, according to another embodiment of the invention, the number of images for each subject ID is displayed on the basis of a subject ID added to image data. That is, the image pickup apparatus includes a memory that stores image data and subject IDs included in the image data and identifying subjects, the image data and the subject ID being related, an image count specifying part that specifies, for each of the subject IDs, the number of the image data which are corresponding to the subject ID and are stored in the memory, and a display that displays a specifying result by the image count specifying part for each of the subject IDs.

Further, the invention can be regarded as a method of acquiring a subject ID from a signal obtained from a subject and adding it to image data. In that case, the subject ID adding method includes acquiring image data obtained by photographing a subject, acquiring, on the basis of a signal obtained from the subject, a subject ID to identify the subject, and connecting the image data and the subject ID to store them.

In the subject ID adding method, when the subject ID is acquired, the subject ID may be acquired on the basis of the signal transmitted from an equipment held by the subject.

In the subject ID adding method, when the subject ID is acquired, the subject ID may be acquired on the basis of the signal transmitted from the equipment by an operation of the subject.

The subject ID adding method may further include transmitting a transmission request of the subject ID to the equipment, and when the subject ID is acquired, the subject ID may be acquired on the basis of the signal transmitted from the equipment in response to the transmitted transmission request.

The subject ID adding method may further include acquiring a distance to the subject obtained when the subject is photographed, and when the subject ID is acquired, a signal from the subject may be specified, among signals obtained from plural objects, by comparing a distance to each of the objects with the acquired distance.

In the subject ID adding method, when the subject ID is acquired, a signal from the subject may be specified, among signals obtained from plural objects, by comparing a direction of each of the objects with a front direction of photographing.

On the other hand, the invention can be regarded as a storage medium storing a computer program to cause a computer to realize the above functions.

According to the embodiments of the invention, even if the subjects are not seated on the seats, the image file with the structure which can be classified according to the subjects can be created by the simple structure.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2004-238295 filed on Aug. 18, 2004 including specification, claims, drawings and abstract is incorporated herein by reference in its entirety.

What is claimed is:

1. An image pickup apparatus comprising:
   an image data acquisition part that acquires image data obtained by photographing a subject;
   a subject ID acquisition part that acquires, on the basis of a signal obtained from the subject, a subject ID to identify the subject;
   a distance acquisition part that acquires a distance to the subject obtained when the subject is photographed;

wherein the subject ID acquisition part specifies, among signals obtained from a plurality of objects, a signal from the subject by comparing a distance to each of the objects with the distance acquired by the distance acquisition part; and a memory that stores the image data acquired by the image data acquisition part and the subject ID acquired by the subject ID acquisition part, the image data and the subject ID being related.

2. An image pickup apparatus according to claim 1, wherein the subject ID acquisition part acquires the subject ID on the basis of the signal transmitted from an equipment held by the subject.

3. An image pickup apparatus according to claim 2, wherein the subject ID acquisition part acquires the subject ID on the basis of the signal transmitted from the equipment by an operation of the subject.

4. An image pickup apparatus according to claim 2, wherein the subject ID acquisition part acquires, as the subject ID, a serial number of a remote controller transmitted from the remote controller to enable photographing of the subject to be performed by an operation of the subject itself.

5. An image pickup apparatus according to claim 2, wherein the subject ID acquisition part acquires the subject ID on the basis of the signal transmitted from the equipment spontaneously without an operation of the subject.

6. An image pickup apparatus according to claim 2, further comprising a transmitter that transmits a transmission request of the subject ID to the equipment, wherein the subject ID acquisition part acquires the subject ID on the basis of the signal transmitted from the equipment in response to the transmission request transmitted by the transmitter.

7. An image pickup apparatus according to claim 1, wherein the subject ID acquisition part specifies, among signals obtained from a plurality of objects, a signal from the subject by comparing a direction of each of the objects with a front direction of photographing.

8. An image pickup apparatus according to claim 7, further comprising a plurality of signal receivers that receive signals transmitted from the respective objects, wherein the subject ID acquisition part specifies the direction of each of the objects on the basis of a difference between reception states of the signals by the respective signal receiver.

9. An image pickup apparatus according to claim 1, further comprising a position specifying part that specifies a position of the subject on the image data by comparing a direction of the subject with a front direction of photographing, wherein the memory stores the image data and information indicating the position specified by the position specifying part, the image data and the information being related.

10. An image pickup apparatus according to claim 1, further comprising:

a position specifying part that specifies a position of the subject on the image data by comparing a direction of the subject with a front direction of photographing.

11. An image pickup apparatus according to claim 10, wherein the memory stores the image data and information indicating the position specified by the position specifying part, the image data and the information being related.

12. A subject ID adding method comprising:

acquiring image data obtained by photographing a subject;

acquiring, on the basis of a signal obtained from the subject, a subject ID to identify the subject, acquiring a distance to the subject obtained when the subject is photographed; and connecting the image data and the subject ID to store them;

wherein the signal is specified among signals obtained from a plurality of objects by comparing a distance to each of the objects with the distance acquired.

13. A subject ID adding method according to claim 12, wherein when the subject ID is acquired, the subject ID is acquired on the basis of the signal transmitted from an equipment held by the subject.

14. A subject ID adding method according to claim 13, wherein when the subject ID is acquired, the subject ID is acquired on the basis of the signal transmitted from the equipment by an operation of the subject.

15. A subject ID adding method according to claim 13, further comprising:

transmitting a transmission request of the subject ID to the equipment, wherein when the subject ID is acquired, the subject ID is acquired on the basis of the signal transmitted from the equipment in response to the transmitted transmission request.

16. A subject ID adding method according to claim 12, wherein when the subject ID is acquired, a signal from the subject is specified, among signals obtained from a plurality of objects, by comparing a distance to each of the objects with the acquired distance.

17. A subject ID adding method according to claim 12, wherein when the subject ID is acquired, a signal from the subject is specified, among signals obtained from a plurality of objects, by comparing a direction of each of the objects with a front direction of photographing.

* * * * *